L. STONE.
Improvement in Fish-Hatching Apparatus.

No. 116,112.

Patented June 20, 1871.

Witnesses.

L. Stone.
by his attorney

UNITED STATES PATENT OFFICE.

LIVINGSTON STONE, OF CHARLESTOWN, NEW HAMPSHIRE.

IMPROVEMENT IN FISH-HATCHING APPARATUS.

Specification forming part of Letters Patent No. 116,112, dated June 20, 1871.

*To all whom it may concern:*

Be it known that I, LIVINGSTON STONE, of Charlestown, of the county of Sullivan and State of New Hampshire, have invented a new and useful Improvement in Pisciculture and in Troughs for Hatching the Spawn of Fish; and do hereby declare the same to be fully described in the following specification and represented in the accompanying drawing, of which—

Figure 1:
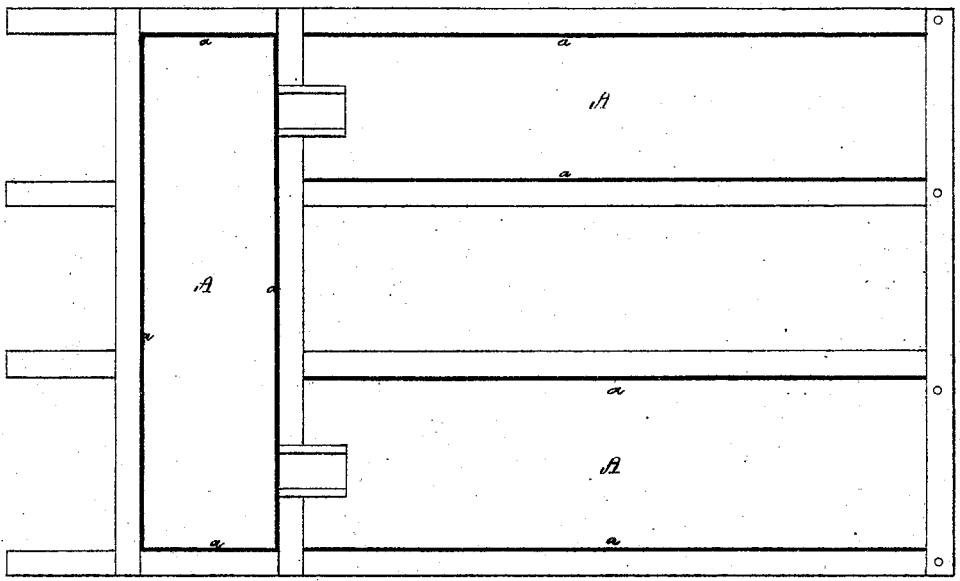
Figure 2:
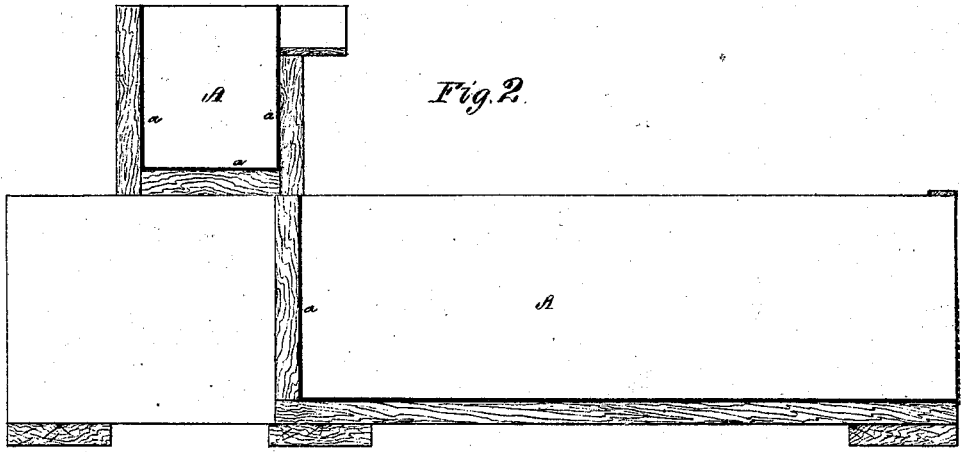

Figure 1 is a top view of a set of my improved troughs. Fig. 2 is a longitudinal section of such.

My invention consists mainly in a fish-spawn hatching-trough, having its inner surface charred or carbonized, or composed in part or in whole of charcoal or carbonized wood.

In the drawing each trough A has its inner surface carbonized or charred, such being as shown at *a*.

I have never, before I made use of it, known carbon thus employed in boxes or troughs for hatching the eggs or spawn of fish, being myself now largely engaged, and for several years past having been extensively engaged in pisciculture. It is highly economical, as, by experience, I have found that for one hundred thousand spawn it effects a saving of about three hundred dollars compared with what can be accomplished by troughs of the ordinary kind heretofore in use.

A carbonized trough, besides facilitating the process of incubation, is not so liable to decay, and, besides, the carbon is a complete preventive of the formation of fungus or vegetable growth, the most destructive enemy of the eggs.

The invention was the result, on my part, of long and costly experiments, involving great labor, thought, and expense. The benefit that ensues from the employment of the carbonized troughs is enormous, comparatively speaking.

At the termination of the hatching season the carbonized troughs are found to be clean and pure, and not even covered with a thin slime, such as would be gathered on the ordinary trough, even when made of glass.

The carbon operates to cleanse and purify the water, thereby nullifying and preventing the injurious results which follow from the employment of impure water.

It has been demonstrated by experience that young trout hatched in the carbonized troughs are much healthier, and there is far less loss of them in the first few months after being hatched, than follows from the use of the old and uncarbonized troughs, the loss by death by the carbonized troughs being less than the one-thousandth part of the number of fish hatched.

I claim as a new manufacture and of my invention—

A fish-hatching box or trough, carbonized or charcoal-lined, as described.

LIVINGSTON STONE.

Witnesses:
 CHARLES C. KIMBALL,
 GEO. S. BOND.